(12) United States Patent
Setliff

(10) Patent No.: US 6,562,512 B2
(45) Date of Patent: May 13, 2003

(54) SIDE TERMINAL ELECTRIC STORAGE BATTERY

(76) Inventor: David Darrell Setliff, 814 Farley Branch Rd., Cool Ridge, WV (US) 25825

( * ) Notice: Subject to any disclaimer, the term of this patent is extended or adjusted under 35 U.S.C. 154(b) by 181 days.

(21) Appl. No.: 09/797,152

(22) Filed: Mar. 1, 2001

(65) Prior Publication Data

US 2002/0122978 A1 Sep. 5, 2002

(51) Int. Cl.[7] .................................................. H01M 2/30

(52) U.S. Cl. ........................................ 429/179; 429/178

(58) Field of Search .................................. 429/178, 179, 429/180–184

(56) References Cited

U.S. PATENT DOCUMENTS

| | | | | |
|---|---|---|---|---|
| 4,424,264 A | * | 1/1984 | McGuire et al. | 429/179 |
| 4,425,414 A | * | 1/1984 | Solomon | 429/179 |
| 4,693,949 A | * | 9/1987 | Kellett et al. | 429/178 |
| 5,162,164 A | | 11/1992 | Dougherty et al. | |
| 5,223,351 A | | 6/1993 | Wruck | |
| 5,633,572 A | | 5/1997 | Steele et al. | |
| 5,726,553 A | | 3/1998 | Waugh | |
| 5,866,274 A | | 2/1999 | Mawston et al. | |
| 5,985,481 A | | 11/1999 | Champagne et al. | |
| 6,057,666 A | | 5/2000 | Dougherty et al. | |
| 6,121,750 A | | 9/2000 | Hwa et al. | |

\* cited by examiner

Primary Examiner—John S. Maples
(74) Attorney, Agent, or Firm—John D. Gugliotta; Olen L. York, III

(57) ABSTRACT

A vehicle battery is provided having a specific arrangement of attachable terminals for adaptation to various geometric configurations.

8 Claims, 4 Drawing Sheets

SIDE TERMINAL ELECTRIC STORAGE BATTERY

RELATED APPLICATIONS

The present invention was first described in Disclosure Document Number 481,404 filed on Oct. 23, 2000 under 35 U.S.C. §122 and 37 C.F.R. §1.14. There are not currently any co-pending applications anywhere in the world.

BACKGROUND OF THE INVENTION

1. Field of the Invention

The present invention relates to automotive vehicle electric storage batteries, and more particularly, to an automotive vehicle side terminal electric storage battery possessing four side terminals that allows polarity swapping of the battery terminal locations simply by reversing the battery orientation.

2. Description of the Related Art

Most automotive vehicles require a power source in the form of an electric storage battery for use in performing the vehicle functions of starting, lighting and ignition. The automotive electric storage batteries are generally fabricated in one of two ways: top terminal and side terminal.

A top terminal battery is normally provided with two terminals positioned in each of two corners of a generally rectangular top wall of a battery container. Top terminal battery terminals are commonly configured in the form of bare metal posts called terminal posts which extend through the top wall of a battery near two corners usually separated by one of the longer sides of the battery. These terminal posts are usually electrically connected to an associated automotive vehicle electrical system by terminal post clamps connected to cables.

Top terminal and side terminal batteries must each be connected with correct polarity to associated vehicle electrical systems for proper operation. Automotive manufacturers generally provide cabled terminal connections which are no longer than strictly necessary to ensure that improper polarity connections do not occur. This results in top terminal and side terminal batteries configured in the manner described above that are unable to properly be connected to associated automotive electrical systems because of battery terminal polarity positions that fail to coincide with associated automotive cabled terminal connection polarity positions. Automotive battery manufacturers have produced top terminal and side terminal batteries having particular terminal polarity positions and identical configured top terminal and side terminal batteries having opposing mounted terminal polarity positions to provide batteries which may be properly connected to the variety of automotive cabled terminal connection polarity positions. This has resulted in large and costly inventories which battery manufacturers and retailers must maintain. Some battery manufacturers have partially reduced these costs by providing top terminal batteries with terminal posts near the ends and near or on the longitudinal center line of the top walls of the batteries. In addition, inventory cost reductions have resulted from the manufacture of batteries referred to as dual terminal batteries. A dual terminal battery normally includes four terminals, a pair of top terminals and a pair of side terminals.

A search of the prior art did not disclose any patents that read directly on the claims of the instant invention; however, the following references were considered related.

The following patents disclose a dual battery system including a main and reserve battery:

U.S. Pat. No. 6,121,750 issued in the name of Hwa et al.

U.S. Pat. No. 5,866,274 issued in the name of Mawston et al.

U.S. Pat. No. 5,223,351 issued in the name of Wruck

U.S. Pat. No. 5,162,164 issued in the name of Dougherty et al.

The following patents describe a method and circuit for controlling charging in a dual battery electrical system:

U.S. Pat. No. 6,057,666 issued in the name of Dougherty et al.

U.S. Pat. No. 5,726,553 issued in the name of Waugh

U.S. Pat. No. 5,985,481 issued in the name of Champagne et al. discloses a reserve battery assembly and related method of use.

U.S. Pat. No. 5,633,572 issued in the name of Steele et al. describes a back-up power supply with a replaceable battery pack.

And, U.S. Pat. No. D 275,062 issued in the name of Sorko-Ram et al. discloses the ornamental design for a convex hemispherical mirror panel for a suspended ceiling grid.

Consequently, a need has been felt for a battery having a specific arrangement of attachable terminals for adaptation to various geometric configurations.

SUMMARY OF THE INVENTION

It is therefore an object of the present invention to provide an improved vehicle battery.

It is a feature of the present invention to provide an improved automotive vehicle side terminal electric storage battery which includes four side terminals to further contribute to reducing battery manufacturer inventory costs.

Briefly according to the preferred embodiment of the present invention, a battery is provided that includes two positive side terminals and two negative side terminals. In a front battery wall there is a positive terminal and a negative terminal and in the opposing rear battery wall there is also a positive terminal and a negative terminal. Adaptors are arranged within the battery housing near a top battery wall to electrically interconnect the terminals having the same polarity.

It is, accordingly, a principal object of this invention to provide an improved side terminal battery which enable side terminal polarity repositioning merely by reversing the battery orientation. An additional object of the invention is to provide improved elements and arrangements whereof in an electric storage battery for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
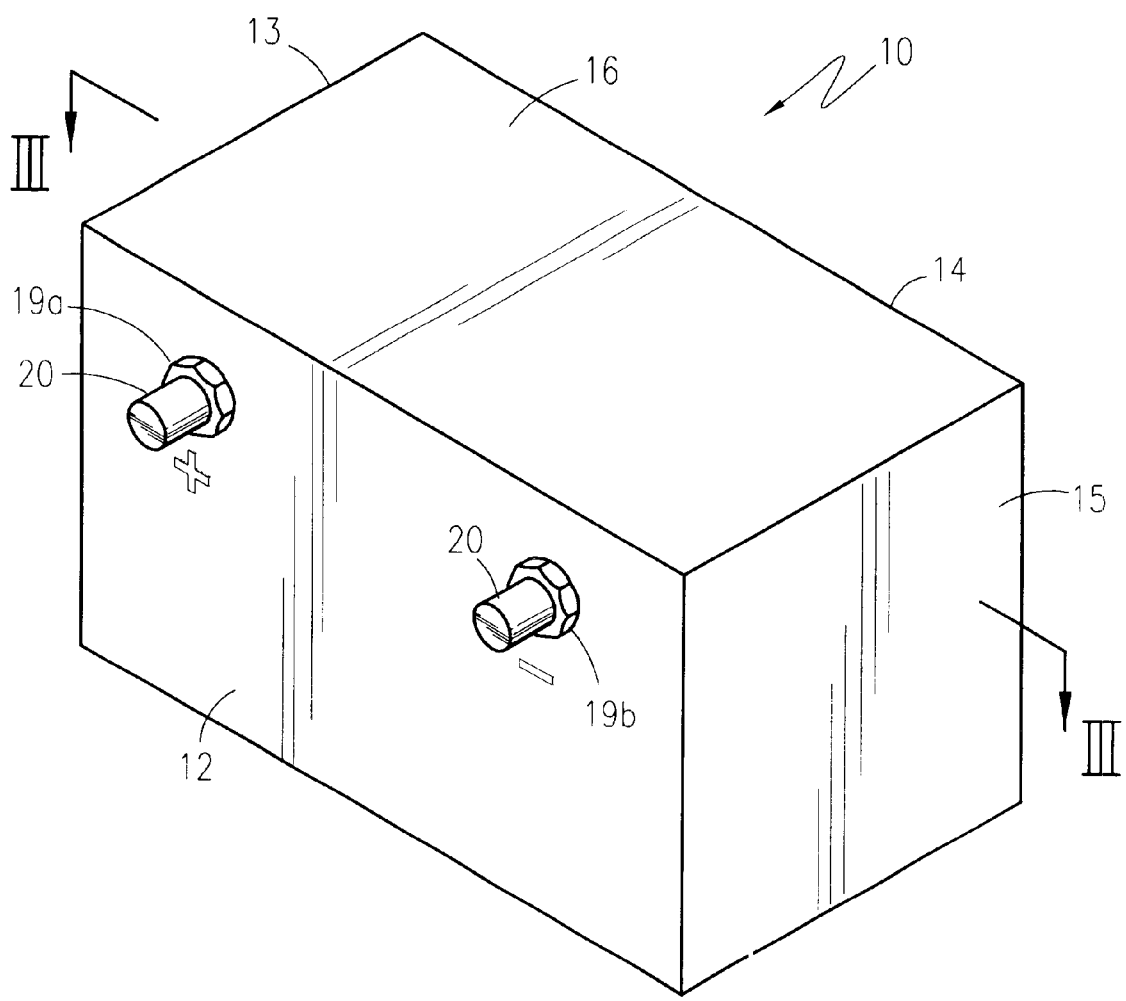
FIG. 1 is a front perspective view of a side terminal electric storage battery according to the preferred embodiment of the present invention.
Figure 2:
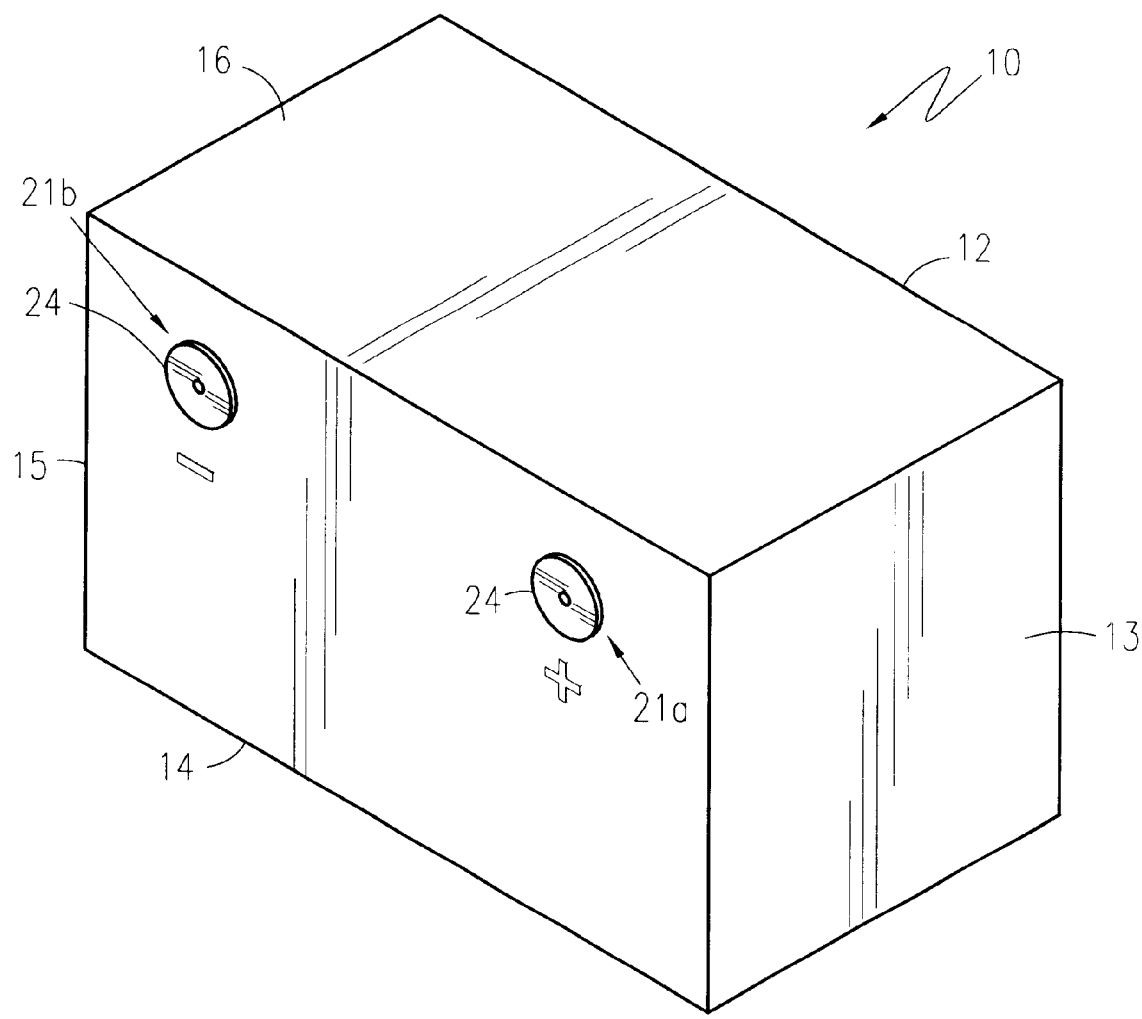
FIG. 2 is a rear perspective view thereof.

Referring now to FIGS. 1–2, a side terminal electric storage battery 10 is shown, according to the present invention, having a conventional block-like configuration having a front wall 12 opposite a rear wall 14 and perpendicularly intersecting a first side wall 13 opposite a second side wall 15 and a top wall 16 opposite a bottom wall (not shown). Penetrating the front wall 12 and in electrical communication with the internal battery cells are a first positive connection 19a and a first negative connection 19b. In conjunction with FIG. 5, these first connections 19a, 19b comprise a female threaded orifice allowing for the threaded engagement of a standardized first side terminal 20 as shown. Similarly, penetrating the rear wall 14 and in electrical communication with the same internal battery cells are a second positive connection 21a and a second negative connection 21b. In conjunction with FIG. 7, these second connections 21a, 21b comprise a female threaded orifice allowing for the threaded engagement of threaded protective plugs 24 as shown.

Figure 3:
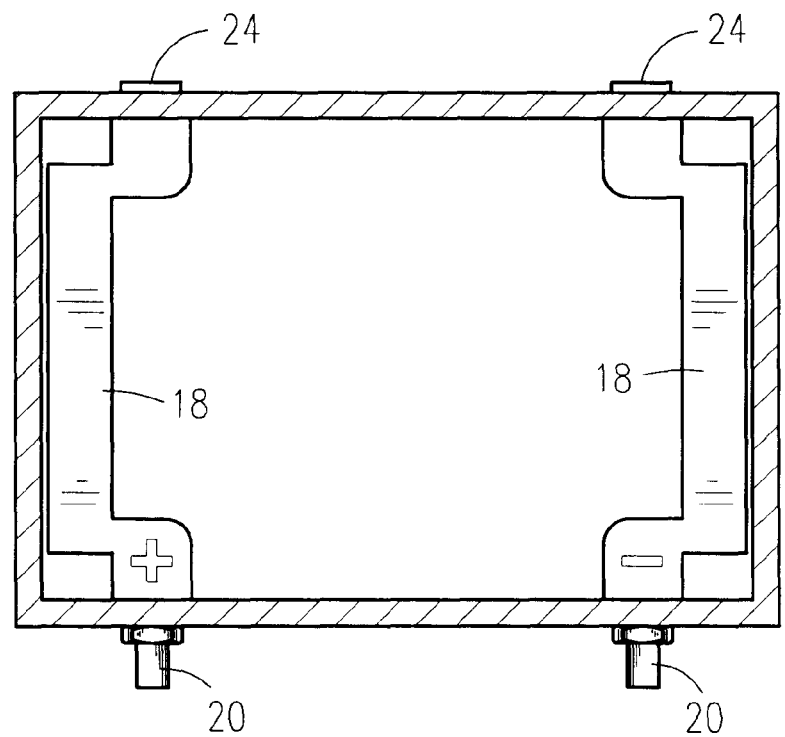
FIG. 3 is a cross sectional view thereof taken along line III—III of FIG. 1.
Figure 4:
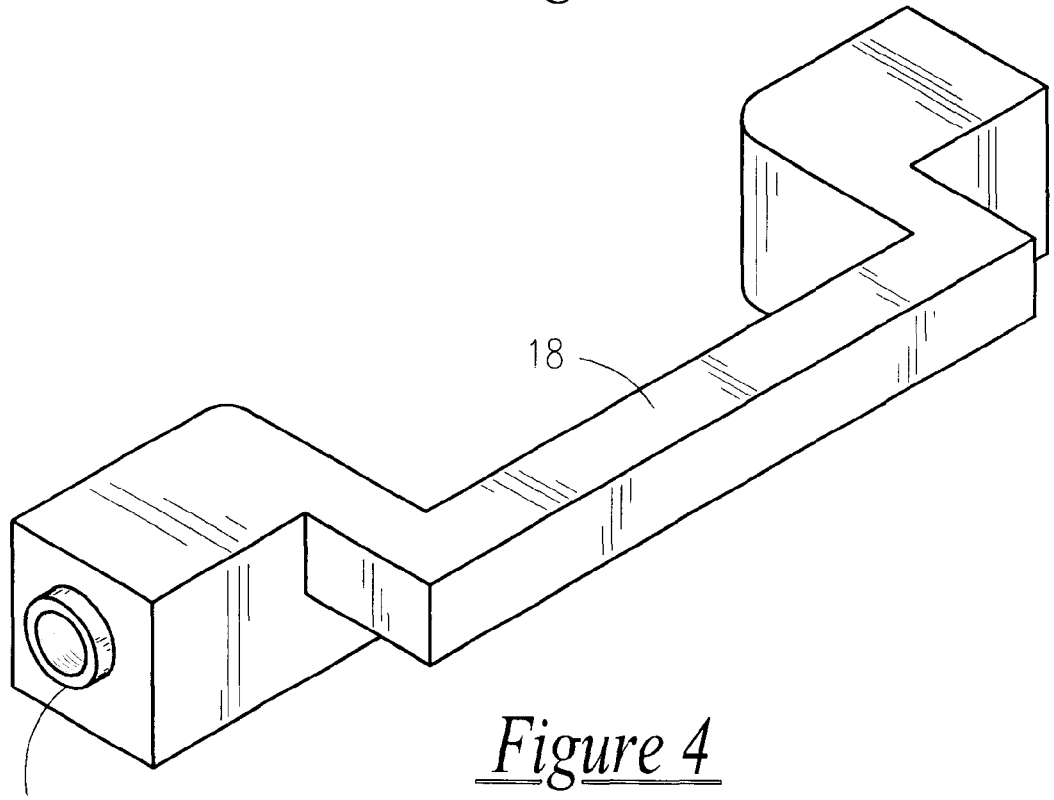
FIG. 4 is a perspective view of an adaptor 18 for use therewith.

Referring to FIGS. 3–4, an adaptor 18 is shown for use with the present invention in which two such adaptors 8 are formed of an electrically conductive material. Each adaptor 18 is linearly elongated and cantileverly offset in a lateral manner, and includes a female threaded receiving orifice 18b at each opposite lateral end. A first such adaptor 18 is used to provide electrical communication between the first positive connection 19a and the second positive connection 21a. A second such adaptor 18 is used to provide electrical communication between the second positive connection 19b and the second negative connection 21b.

Figure 5:
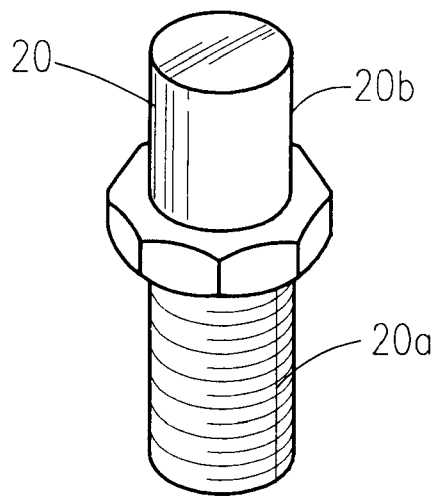
FIG. 5 is a perspective view of a threaded terminal post 20 for use therewith.
Figure 6:
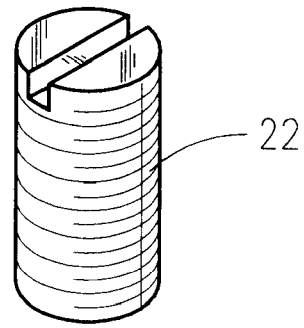
FIG. 6 is a perspective view of a threaded terminal plug 22 for use therewith.
Figure 7:
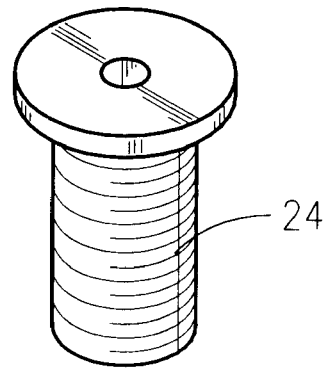
FIG. 7 is a perspective view of a threaded plastic protective plug 24 for use therewith.

In greater detail, FIGS. 5–7 show in greater detail a series of interchangeable posts for threadably engaging with the first connections 19a, 19b and second connections 21a, 21b. In particular, FIG. 5 is a perspective view of a threaded terminal post 20 formed of an electrically conductive material and having a lower threaded rod 20a linearly aligned with an upper connection surface 20b. The upper connection surface 20b is anticipated as being of equivalent size, shape, and functionality as an otherwise conventional battery terminal located on an otherwise conventional battery as available in the conventional art. As such, the connection surface 20b would be mechanically and electrically connected to a vehicle's electrical system. The lower threaded rod 20b can be selectively threadingly engaged within the first connections 19a, 19b or the second connections 21a, 21b.

In this manner, the threaded terminal post 20 can be affixed in a manner of variable physical geometry, relative to each other and/or the vehicle in order to provide attachable terminals for adaptation to various geometric configurations.

FIG. 6 is a perspective view of a threaded terminal plug 22 for threadably engaging with the first connections 19a, 19b and second connections 21a, 21b in a manner alternate to the threaded terminal post 20. The terminal plug 22 is also formed of an electrically conductive material and forms a threaded rod that can be selectively threadingly engaged within the first connections 19a, 19b or the second connections 21a, 21b.

FIG. 7 is a perspective view of a threaded protective plug 24 for engaging with the first connections 19a, 19b and second connections 21a, 21b. It is anticipated that the protective plug 24 would be formed of a plastic, or other non-electrically conductive material and having a lower threaded rod that can be selectively threadingly engaged within the first connections 19a, 19b or the second connections 21a, 21b in order to electrically insulate the threaded metal recesses from potentially contacting any metal portion of a vehicle, or merely to prevent the intrusion of dirt and/or water into the connection orifices.

2. Operation of the Preferred Embodiment

In operation, the present invention is uses as one would use an otherwise conventional vehicle battery. However, in order to accommodate various geometric configuration within a vehicle's engine compartment, the side terminals 20 can be move to be positioned along various walls in order to obtain convenient physical access.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. By way of example, and not by limitation, the inclusion of additional connections, or the positioning of connection along one or more side wall or top wall is also anticipated. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be limited only by the following claims.

What is claimed is:

1. A vehicle battery comprising:

a first wall;

a second wall, said second wall opposite said first wall;

a first positive connection penetrating said first wall and in electrical communication with internal battery cells;

a first negative connection penetrating said first wall and in electrical communication with said internal battery cells;

a second positive connection penetrating said second wall and in electrical communication with the internal battery cells;

a second negative connection penetrating said second wall and in electrical communication with said internal battery cells; and a threaded terminal plug for threadably engaging said first connections and said second connections and formed of a non-electrically conductive material and having a lower threaded rod that can be selectively threadingly engaged within said connections in order to electrically insulate threaded metal recesses from potentially contacting any metal portion of a vehicle, or merely to prevent the intrusion of dirt and water into connection orifices.

2. The vehicle battery of claim 1, wherein said first positive connection, said first negative connection, said second positive connection, and said second negative connection each comprise a female threaded orifice allowing for threaded engagement of a battery terminal.

3. The vehicle battery of claim 2, wherein said battery terminal comprises a threaded terminal post formed of an electrically conductive material and having a lower threaded rod linearly aligned with an upper connection surface.

4. The vehicle battery of claim 1, wherein common electrical communication is provided between said first positive connection and said second positive connection.

5. The vehicle battery of claim 4, wherein said electrical communication is provided by a first adaptor, said first adaptor comprising a linearly elongated and cantilevered configuration, said first adaptor aligned substantially parallel to said first wall.

6. The vehicle battery of claim 1, wherein common electrical communication is provided between said first negative connection and said second negative connection.

7. The vehicle battery of claim 6, wherein said electrical communication is provided by a second adaptor, said second adaptor comprising a linearly elongated and cantilevered configuration, said second adaptor aligned substantially parallel to said second wall.

8. The vehicle battery of claim 1, further comprising a pair of interchangeable posts for threadably engaging with said first positive connection, said second positive connection, said first negative connection, and said second negative connection.

* * * * *